US012601930B2

(12) United States Patent
Chalmey et al.

(10) Patent No.: US 12,601,930 B2
(45) Date of Patent: Apr. 14, 2026

(54) SOLAR LENS WITH SUPER COLOR ENHANCING PROPERTIES

(71) Applicant: Essilor International, Charenton-le-pont (FR)

(72) Inventors: Jonathan Chalmey, Charenton-le-pont (FR); Christelle Marck, Charenton-le-pont (FR)

(73) Assignee: Essilor International, Charenton-le-pont (FR)

( * ) Notice: Subject to any disclaimer, the term of this patent is extended or adjusted under 35 U.S.C. 154(b) by 936 days.

(21) Appl. No.: 17/779,399

(22) PCT Filed: Nov. 24, 2020

(86) PCT No.: PCT/EP2020/083183
§ 371 (c)(1),
(2) Date: May 24, 2022

(87) PCT Pub. No.: WO2021/105108
PCT Pub. Date: Jun. 3, 2021

(65) Prior Publication Data
US 2023/0030555 A1 Feb. 2, 2023

(30) Foreign Application Priority Data
Nov. 25, 2019 (EP) ..................................... 19306519

(51) Int. Cl.
*G02C 7/10* (2006.01)
*G02B 5/22* (2006.01)
(Continued)

(52) U.S. Cl.
CPC ............... *G02C 7/10* (2013.01); *G02B 5/223* (2013.01); *G02B 5/3033* (2013.01); *G02C 7/104* (2013.01); *G02C 7/108* (2013.01); *G02C 7/12* (2013.01)

(58) Field of Classification Search
CPC .... G02B 5/3033; G02B 5/223; G02B 5/3025; G02B 5/30; G02B 5/305; G02C 7/104;
(Continued)

(56) References Cited

U.S. PATENT DOCUMENTS

| | | | |
|---|---|---|---|
| 2,298,058 A | 10/1942 | Land | |
| 6,102,539 A | * 8/2000 | Tucker ..................... | G02C 7/10 351/44 |

(Continued)

FOREIGN PATENT DOCUMENTS

| | | |
|---|---|---|
| EP | 1580591 | 9/2005 |
| EP | 3457197 | 3/2019 |

(Continued)

OTHER PUBLICATIONS

International Search Report and Written Opinion issued in Corresponding PCT Application No. PCT/EP2020/083183, dated Feb. 3, 2021.

(Continued)

*Primary Examiner* — William R Alexander
*Assistant Examiner* — Matthew Y Lee
(74) *Attorney, Agent, or Firm* — Norton Rose Fulbright US LLP

(57) ABSTRACT
An optical article partially transmits polarized glare in tunable colors that help a user to see surface contours, while enhancing the color and at the same time maintaining the appearance of the lens still neutral.

12 Claims, 3 Drawing Sheets

(51) Int. Cl.
    *G02B 5/30*         (2006.01)
    *G02C 7/12*         (2006.01)

(58) Field of Classification Search
    CPC . G02C 7/108; G02C 7/12; G02C 7/10; G02C
                               2202/16
    See application file for complete search history.

(56)               References Cited

U.S. PATENT DOCUMENTS

| | | | |
|---|---|---|---|
| 6,145,984 A | 11/2000 | Farwig | |
| 2002/0135735 A1 | 9/2002 | Yamamoto et al. | |
| 2005/0122587 A1* | 6/2005 | Ouderkirk | G02B 5/305 |
| | | | 359/487.05 |
| 2008/0231795 A1 | 9/2008 | Cartier | |
| 2013/0141693 A1* | 6/2013 | McCabe | B29D 11/00865 |
| | | | 351/159.56 |
| 2017/0139234 A1* | 5/2017 | Sharp | G02B 27/288 |
| 2017/0176775 A1* | 6/2017 | Mappes | G02C 7/108 |
| 2017/0235160 A1* | 8/2017 | Larson | G02C 7/104 |
| | | | 351/45 |
| 2019/0033620 A1* | 1/2019 | Yahagi | G02B 5/3016 |

FOREIGN PATENT DOCUMENTS

| | | |
|---|---|---|
| EP | 3663839 | 6/2020 |
| WO | WO 2017/070552 | 4/2017 |

OTHER PUBLICATIONS

Office Action issued in corresponding European Application No. 19306519.0, dated Apr. 18, 2023.

\* cited by examiner

| | Criteria linked to patent application n* 18 306 638.4 | | | Criteria linked to color enhancement EP3457197 | | Combined criteria | |
|---|---|---|---|---|---|---|---|
| | $\Delta PE(\lambda)$ [456-650nm] >30% | $\Delta h$ [Random/Perp] >20% | L2 >20% | $Qsign_{Red}/Qsign_{Green}$ | $\Delta T\%$ [515-580nm] | L2 * $\Delta T\%$ [515-580nm] | h2 [Perp] |
| Example 0 | ~75% | | 29 | 1.1 | 5% | 145 | 219 (blue) |
| Example1 | ~75% | 27 | 30 | 1.5 | 12% | 360 | 209 (blue) |
| Example 2 | <10% | 14 | 4 | 1.5 | 7% | 28 | 278 (blue) |
| Example 3 | <10% | 156 | 0 | 1.0 | 4% | 0 | 1 (red) |
| Example 4 | ~75% | 132 | 35 | 1.3 | 5% | 175 | 356 (red) |

*FIG. 3*

SOLAR LENS WITH SUPER COLOR ENHANCING PROPERTIES

CROSS-REFERENCE TO RELATED APPLICATIONS

This application is a national phase application under 35 U.S.C. § 371 of International Application No. PCT/EP2020/0083183 filed 24 Nov. 2020, which claims priority to European Patent Application No. 19306519.0 filed 25 Nov. 2019. The entire contents of each of the above-referenced disclosures is specifically incorporated by reference herein without disclaimer.

BACKGROUND

Technical Field

The present application relates to optical articles that partially transmit polarized glare in certain tunable colors whereas the appearance of the optical article is still neutral.

Description of the Related Art

Light is typically non-directional, and light wave oscillations are typically not uniformly aligned, i.e., light waves are randomly oriented in all directions. When light is reflected from flat surfaces, it tends to become plane-polarized, meaning light wave oscillations are uniformly aligned in the same (usually horizontal) direction. This creates a bothersome and potentially dangerous intensity of reflected light that causes glare and reduces visibility.

Sunglass lenses primarily exist as one of two types: (1) tinted, non-polarized; and (2) polarized. Tinted, non-polarized sunglasses employ a color tint that reduces light transmission through the lens. Due to the absence of a polarizing filter, these sunglass lenses do not block polarized glare. Polarized lenses include a polarizing filter and block most of the polarized glare light.

In some instances, it is beneficial for a sunglass wearer to employ polarized lenses that highlight and call attention to plane-polarized light. Tinted, non-polarized lenses would not reduce glare reflected from the water.

People involved in outdoor activities such as skiing, skating, bike riding, and driving benefit from viewing some level of polarized glare. For example, an automobile driver driving on an icy road would benefit from noticing icy patches that reflect plane-polarized light. To that end, it would be beneficial to produce a sunglass lens or other optical article that allows some plane polarized light to pass through the lens. It would also be beneficial to render the polarized glare in a certain tunable color that is visually more perceptive than a regular tinted lens or a regular polarized lens. Lenses that are configured to color plane-polarized light transmitted through the lens will draw the wearer's attention and help identify the contours or "dangers" on the surface Lenses described in the application EP 18 306 636.4 "Optical articles with specific color glare", incorporated herein by reference, partially transmit polarized glare in tunable colors that help a user see surface contours. This type of optical article finds use in active sports such as skiing, skating, bike riding and water sports, and in detecting potentially dangerous surfaces such as "black ice" on a road.

On the other hand, for a non-polarized lens, the unpolarized light that comes through the lens is selectively absorbed depending on its wavelength. Attenuating light around 580 nm where photoreceptors overlap will enhance colors' perception. This color enhancing technology (also described in EP 3457197, "Optical lens for correcting color vision") especially enhances red colors.

SUMMARY

The embodiments presented herein provide optical articles that partially transmit polarized glare in tunable colors that help a user to see surface contours, while enhancing the color and at the same time maintaining the appearance of the lens still neutral (e.g., grey or brown or grey-green). In some embodiments, the optical articles are as defined in the claims.

In one embodiment, the optical article has a color A and comprises: an optical article base material; a polarizing layer having a first color tint of color B; and a second color tint of color C. In some embodiments, the first color tint is blue.

A lens exhibiting polarizing efficiency $PE(\lambda)<50\%$ in the 400-520 nm range ($<50\%$ in the 440-480 nm range) and $>60\%$ in the 600-700 nm range is tinted into a neutral color while absorbing selectively at around 580 nm. For example, a bluish mid-PE polar lens is tinted with complementary dyes to result in a grey or brown or grey-green lens with visible light transmission ~14%. The use of a dye that specifically absorbs around 580 nm (range 530-630 nm), where photoreceptors overlap, enhances color perception from un-polarized light.

BRIEF DESCRIPTION OF THE DRAWINGS

The application will be better understood in light of the description which is given in a non-limiting manner, accompanied by the attached drawings in which:

FIG. 3 shows particular values for the various parameters linked to a first criterion and the color enhancement effect used in the Example lenses cited in FIG. 2.

DETAILED DESCRIPTION OF THE PREFERRED EMBODIMENTS

In the following discussion, the polarizing efficiency $PE(\lambda)$ as a function of wavelength of a lens is given by $$PE(\lambda)=[(T(\lambda)par-T(\lambda)perp)/(T(\lambda)par+T(\lambda)perp)]*100 \qquad (1)$$

where $T(\lambda)par$ and $T(\lambda)perp$ are transmittance of light polarized parallel to the polarization axis of the lens at wavelength $\lambda$, and transmittance of light polarized perpendicular to the polarization axis of the lens at wavelength $\lambda$, respectively. The overall polarizing efficiency is represented by the equation:

$$PE=[(\tau v(par)-\tau v(perp))/(\tau v(par)+\tau v(perp))]*100 \qquad (2)$$

where $\tau v(par)$ and $\tau v(perp)$ are visible light transmittance of light polarized parallel and perpendicular to the polarization axis of the lens, respectively. The $\tau v$ values are in turn calculated from the formula:

$$\tau v\ \% = \frac{\sum D(\lambda)*V_M(\lambda)*t(\lambda_- + \Delta(\lambda)}{\sum D(\lambda)*V_M(\lambda)*\Delta(\lambda)} \qquad (3)$$

US 12,601,930 B2

3 where τv % is visible light transmission, D(λ) is spectral distribution of CIE illuminant D65, $V_M(\lambda)$ is CIE standard photopic luminous efficiency, t(λ) is spectral transmittance in the 380-780 nm range, and Δ(λ) is wavelength interval.

In the following discussion, mid-PE lens is a lens where the difference in polarizing efficiency (ΔPE(λ)) of light transmitted through the optical article is at least 30% between a first visible wavelength and a second different visible wavelength. In one embodiment, this mid-PE lens is tinted to a neutral grey (or brown or grey green) color through a dip tinting process so that the τv % of the tinted lens is in the category 3 range (8-18%). The tinted lens can be used as a regular sun lens. When there is polarized glare, the lens will transmit bluish colors thereby enhancing the bluish color of the sky.

Figure 1:
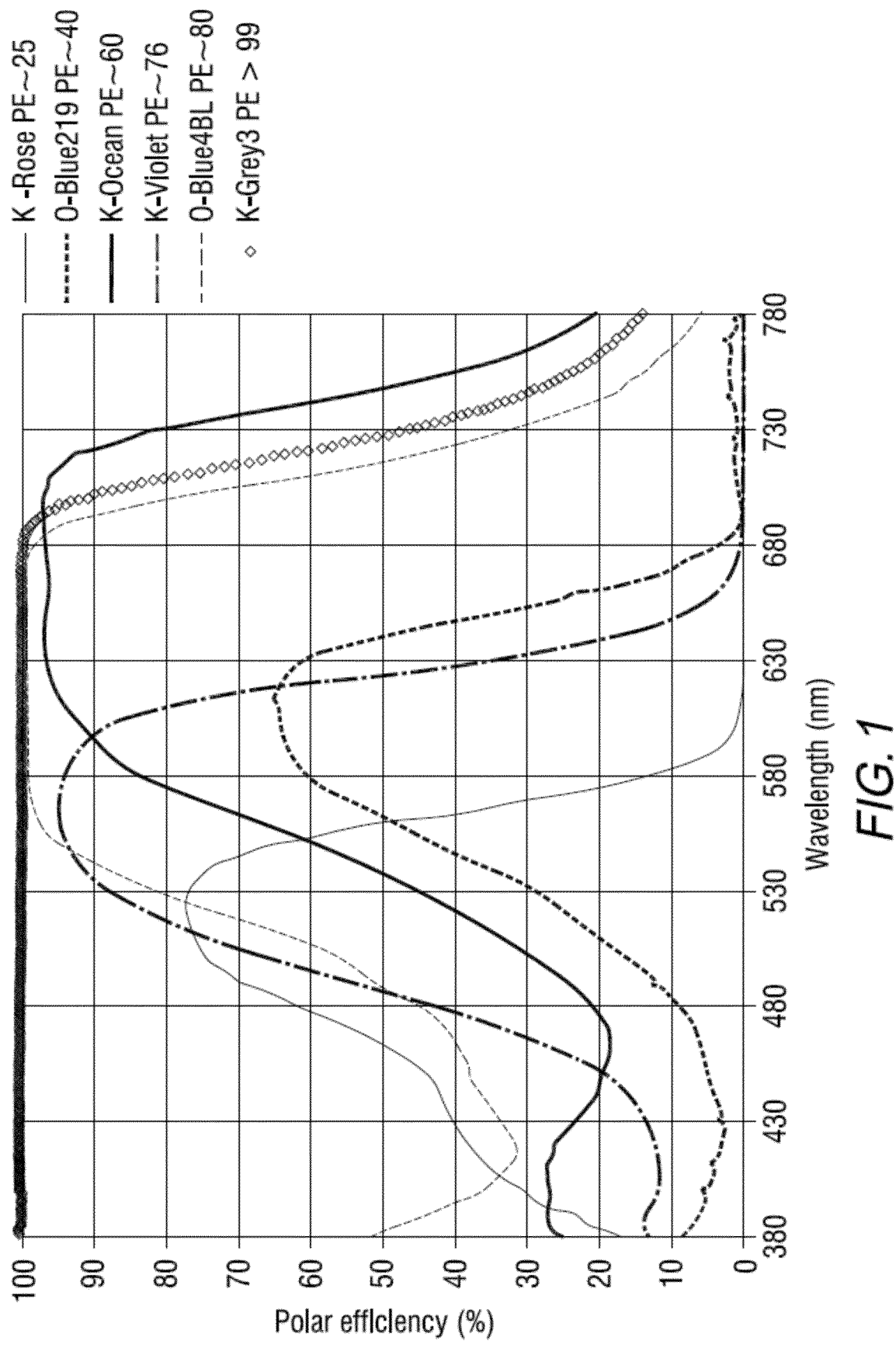
FIG. 1 shows a polarizing efficiency vs. wavelength curve for various lenses.

FIG. 1 shows PE=f(λ) of different mid-PE lenses that can be used for this purpose. PE(λ) is low in one wavelength range, and higher in other visible wavelength ranges, resulting in an optical article that partially transmits polarized glare in bluish tint.

FIG. 1 also shows 2 counterexamples which cannot be used for this application: 1) Black spectrum (K-Grey3 PE>99%), i.e., a high-PE lens which cuts too much glare and 2) Pink spectrum (K-Rose PE~25) i.e., a mid-PE lens which colorizes the glare into pink.

In one embodiment, the above mid-PE lens is tinted into a neutral color while absorbing selectively at around 580 nm. In particular, a bluish mid-PE polar lens is tinted with complementary dyes to result in a grey or brown or grey-green lens with τv %~14% (Category 3). The use of a dye that specifically absorbs around 580 nm (range 530-630 nm]), where photoreceptors overlap, will enhance colors perception from un-polarized light. This color brought by dip tinting of non-dichroic dyes can also be done by mass tinting, film lamination, interferential coatings, or additional coating.

While in principle, any mid-PE colors can be used to realize this embodiment, in order to have the color enhancement effects, it is beneficial to use a blue polar lens because the polarization efficiency of the blue polar lens is low at 490 nm, hence objects which are sources of highly polarized light, like the sky and the sea, will appear bluer. As such, while a classical color enhancement technology uses 2 dyes—one to absorb at 490 nm and the other at 580 nm, as explained above, in this embodiment only one dye is needed to obtain the color enhancing (CE) effect, because the functionality of the other absorption dye is carried by a good choice of the polar lens.

One embodiment of the optical article of this application (Example 1) as well as other types of lenses, for comparison, are described in the following (in all the embodiments, commercially available dyes with their trade names are listed).

Example 0 (WO Mid-PE Ocean to Grey 3 Lens)=Counterexample

Lens: commercially available uncoated specific colored +0.00D CR39 substrate based polarizing lenses (from KBCo) such as Ocean (Blue), PE(λ)<50% in the 400-520 nm range (<30% in the 440-480 nm range) and >90% in the 600-700 nm range. The total PE (380-780 nm range) is around 60% and the τv % is around 47%.
Dip tinting: mixture of HUNTSMAN Teratop NFG, NFR, NFB in water at 94° C. Dip tinting time around 1 h.

Example 1 (WO Mid-PE Ocean to Grey 3+CE)

Lens: commercially available uncoated specific colored +0.00D CR39 substrate based polarizing lenses (from KBCo) such as Ocean (Blue), PE(I)<50% in the 400-520 nm range (<30% in the 440-480 nm range) and >90% in the 600-700 nm range. The total PE (380-780 nm range) is around 60% and the τv % is around 47%.
Dip tinting: mixture of HUNTSMAN Teratop NFG, NFB and M. DOHMEN Heliotrop Lumacel R in water at 94° C. Dip tinting time around 1 h.

Example 2 (Polar High-PE Grey 3+CE)=Counterexample

Lens: Xperio Grey 1 +0.00D CR39 substrate based polarizing lenses (from KBCo). PE(λ) >90% in the whole 400-700 nm range. The total PE (380-780 nm range) is >95% and the τv % is around 32%.
Dip tinting: mixture of HUNTSMAN Teratop NFG, NFB and M. DOHMEN Heliotrop Lumacel R in water at 94° C. Dip tinting time around 1 h.

Example 3 (Polar Grey 3 Xperio)=Counterexample

Lens: Xperio Grey 3 +0.00D CR39 substrate based polarizing lenses (from KBCo). PE(λ) >90% in the whole 400-700 nm range. The total PE (380-780 nm range) is >95% and the % τv is around 14%.

Example 4 (WO Mid-PE Rose to Grey 3 Lens)=Counterexample

Figure 2:
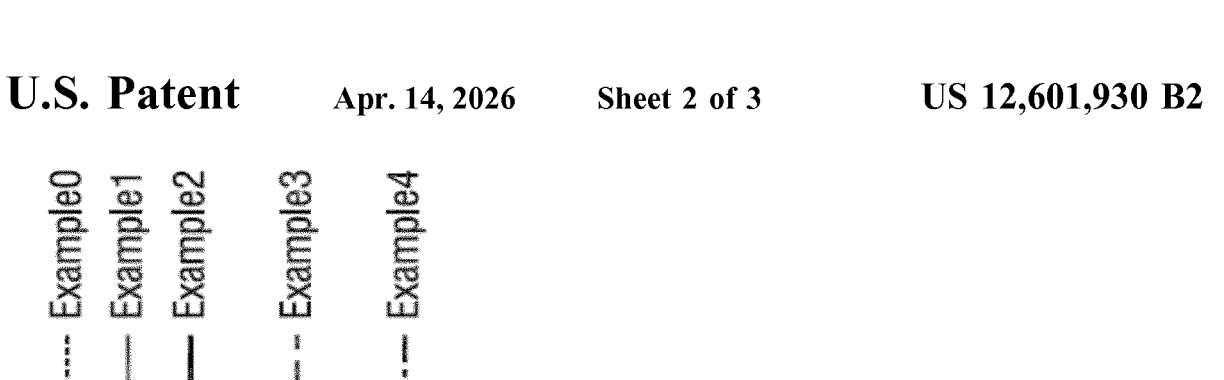
FIG. 2 shows a transmission vs. wavelength curve for various Example lenses.

Lens: commercially available uncoated specific colored +0.00D CR39 substrate based polarizing lenses (from KBCo) such as Rose, PE(λ)>50% in the 460-560 nm range and <50% in the other range. The total PE (380-780 nm range) is around 25% and the τv % is around 46%.
Surface tinting by sublimation: mixture of Nidek NK1R, NK1Y, NK1B dyes.
Transmission results for the above four Example lenses are shown in FIG. 2.
Examples 0, 3 and 4 are not designed to enhance the colors from non-polarized light. In addition, there is no specific absorbance peak ~580 nm.
On the other hand, Examples 1 and 2 are designed to enhance the colors from non-polarized light. FIG. 2 shows a specific absorbance peak (minimum transmission) ~580 nm. The numeric representation of this parameter is $\Delta T \%_{[515-580nm]}$ as described below.
$\Delta T \%_{[515-580nm]}$ is a parameter which describes the transmittance of randomly polarized light which is green-yellow in color. Enhancement of transmission in this wavelength region is necessary for visually-perceived color enhancement effect.
L2 describes the lightness of the incident perpendicularly-polarized light, i.e., light polarized perpendicular to the polarization axis of the lens. When this number is low, it means that the perceived image by the eye is dark (dark/grey image with low color level perceived) and when the number is high, the perceived image by the eye is light (light image with color easily perceived).
By multiplying a first spectral criterion that describes the effect of EP 18 306 636.4 (L2 which expresses the quantity of colorized glare that comes into the eyes) with a second criterion that describes the color enhancement effect (ΔT $\%_{[515-580nm]}$) which describes the specific absorbance around 580 nm, one can discriminate the 5 Examples and prove that the effect obtained for Example 1 (invention) is much more intense that a simple combination of Example 0 and Example 2. In other words, L2*ΔT % computes the intensity of perpendicularly polarized light within the green-yellow color wavelength range multiplied by the color enhancement degree, which can be used to quantify the color enhancement degree for an optical article that partially transmits polarized glare in a tunable color. The threshold can be fixed >200.

h2 perp describes the hue of the incident perpendicularly-polarized light. Since glare is horizontally polarized, which is mostly cut by the polar filters, the perceived color of the object which reflects light will be determined by h2perp. In the case where the glare is coming from the sun, having h2perp in the blue hues will make the blue skies appear bluer. This h2perp parameter defines the perceived color of the surface on which polarized light is produced.

The choice of the tint in which the polarized light will be tuned in is essential for this embodiment. h2 has to be correctly selected in the bluish area. However, since the two main wavelengths to cut for a color enhancement effect is 490 nm and 580 nm, one could also start with a yellow polar lens and add dyes which absorb at 490 nm to get a color enhancement effect (opposite strategy to the above described example). In this case, the final hue of h2perp will be between 30° and 90° (yellow/orange color) and the color enhancement effect will be observed with orange/yellow polarized light (i.e. sunrise/sunset).

Particular values for the various parameters linked to the first criterion and the color enhancement effect used in the above four Examples are shown in FIG. 3.

The parameter $Qsign_{Red}/Qsign_{Green}$ is described in EP 3457197, and refers to Q values according to the standard ISO 13866-2013 (page 43, § 15.5).

Those skilled in the art will also understand that there can be many variations made to the operations of the techniques explained above while still achieving the same objectives. Such variations are intended to be covered by the scope of this disclosure. As such, the foregoing descriptions of the embodiments are not intended to be limiting. Rather, any limitations to the embodiments are presented in the following claims.

The invention claimed is:

1. An optical article configured to color plane-polarized light transmitted through the optical article, the optical article having a color A and comprising:
   an optical article base material;
   a polarizing layer having a first color tint of color B; and a second color tint of color C, wherein
   a hue h2perp of perpendicularly polarized light transmitted through the optical article is in the blue range:
   a lightness L2 in response to perpendicularly-polarized light transmitted through the optical article is greater than 20, and
   the product $L2*\Delta T\%_{[515-580nm]}$ is greater than 200, where $\Delta T\%_{[515-580nm]}$ is a parameter describing the transmittance of randomly polarized light in the green-yellow range.

2. The optical article of claim 1, wherein a difference in polarizing efficiency $\Delta PE(\lambda)$ of light transmitted through the optical article is at least 30% between a first visible wavelength and a second different visible wavelength in the range of 450 to 650 nm.

3. The optical article of claim 1, wherein the color B is blue with h angle in the range [200, 320].

4. The optical article of claim 1, wherein the color A is grey or brown or grey-green.

5. The optical article of claim 4, wherein the color A has an a* ranging from −10 to 10 and a b* ranging from −10 to 10.

6. The optical article of claim 4, wherein the color A has an a* ranging from 0 to 20 and a b* ranging from 25 to 45.

7. The optical article of claim 4, wherein the color A has an a* ranging from −20 to 0 and a b* ranging from 0 to 20.

8. The optical article of claim 1, wherein the total polarizing efficiency is between 10% and 90% in the 380 to 780 nm range and the visible light transmission τv % is between 8% and 18%.

9. The optical article of claim 1, wherein the first color tint is provided within the polarizing layer.

10. The optical article of claim 1, wherein the second color tint is provided within the polarizing layer, on a surface of the polarizing layer, on an additional film laminated on the polarizing layer, within the optical base material, or on a surface of the optical base material, or any combination thereof.

11. The optical article of claim 1, wherein the second color tint is a mixture of dyes.

12. The optical article of claim 1, wherein the optical article is a sunglass lens, a goggle lens, a contact lens, a helmet shield, a windshield, a vehicle window, or a building window.

* * * * *